(12) United States Patent
Hong et al.

(10) Patent No.: US 10,856,201 B2
(45) Date of Patent: Dec. 1, 2020

(54) HANDOVER CONTROL METHOD AND DEVICE THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/090,335

(22) PCT Filed: Mar. 29, 2017

(86) PCT No.: PCT/KR2017/003431
§ 371 (c)(1),
(2) Date: Oct. 1, 2018

(87) PCT Pub. No.: WO2017/171405
PCT Pub. Date: Oct. 5, 2017

(65) Prior Publication Data
US 2019/0116541 A1    Apr. 18, 2019

(30) Foreign Application Priority Data

Apr. 1, 2016  (KR) ................. 10-2016-0040471
Mar. 22, 2017 (KR) ................. 10-2017-0036293

(51) Int. Cl.
*H04W 4/00*        (2018.01)
*H04W 36/36*       (2009.01)
(Continued)

(52) U.S. Cl.
CPC ............ *H04W 36/36* (2013.01); *H04W 8/08* (2013.01); *H04W 36/08* (2013.01); *H04W 76/27* (2018.02);
(Continued)

(58) Field of Classification Search
None
See application file for complete search history.

(56) References Cited

U.S. PATENT DOCUMENTS

2012/0008596 A1   1/2012  Jung et al.
2012/0218973 A1   8/2012  Du et al.
(Continued)

FOREIGN PATENT DOCUMENTS

CN    101064561 A    10/2007
CN    102238665 A    11/2011
(Continued)

OTHER PUBLICATIONS

Samsung, "Motivation for New WI proposal: Seamless Handover for LTE", RP-160215, 3GPP TSG RAN Meeting #71, Gothenburg, Sweden, Mar. 7-10.
(Continued)

*Primary Examiner* — Zewdu A Beyen
(74) *Attorney, Agent, or Firm* — IP Legal Services, LLC

(57) ABSTRACT

Provided are a control method for decreasing a service interruption delay in a handover procedure of a mobile communication terminal, and a device therefor. The method of a source base station may include: transmitting, to a target base station, a handover request message including information indicating an improved handover mode for decreasing service interruption when handover of a terminal is determined; receiving a handover request confirmation message including the information indicating the improved handover mode from the target base station; transmitting a radio resource control (RRC) connection reestablishment message including mobility control information to the terminal; and maintaining connection to the UE and continually transmitting data to or receiving data from the terminal through the connection until the terminal transmits a first signal to a target cell of the target base station according to the improved handover mode.

3 Claims, 7 Drawing Sheets

(51) Int. Cl.
  *H04W 8/08*   (2009.01)
  *H04W 76/27*  (2018.01)
  *H04W 36/08*  (2009.01)
  *H04W 80/02*  (2009.01)
  *H04W 74/08*  (2009.01)
  *H04W 76/20*  (2018.01)
  *H04W 36/18*  (2009.01)

(52) U.S. Cl.
  CPC ........ *H04W 36/18* (2013.01); *H04W 74/0833* (2013.01); *H04W 76/20* (2018.02); *H04W 80/02* (2013.01)

(56) References Cited

U.S. PATENT DOCUMENTS

| | | |
|---|---|---|
| 2013/0003648 A1 | 1/2013 | Hahn et al. |
| 2013/0250925 A1* | 9/2013 | Lohr ................ H04W 72/0446 370/336 |
| 2015/0071251 A1 | 3/2015 | Gupta et al. |
| 2015/0109927 A1* | 4/2015 | Ozturk ................ H04W 40/20 370/235 |
| 2015/0110071 A1 | 4/2015 | Jo et al. |
| 2015/0215838 A1* | 7/2015 | Li ........................ H04W 12/04 370/331 |
| 2016/0286449 A1 | 9/2016 | Choi et al. |
| 2016/0381611 A1 | 12/2016 | Uchino et al. |

FOREIGN PATENT DOCUMENTS

| | | |
|---|---|---|
| KR | 10-2011-0135860 A | 12/2011 |
| KR | 10-2013-0028102 A | 3/2013 |
| KR | 10-2015-0046527 A | 4/2015 |
| KR | 10-2015-0086171 A | 7/2015 |
| KR | 10-2015-0143428 A | 12/2015 |
| WO | 2016/031779 A1 | 3/2016 |

OTHER PUBLICATIONS

State Intellectual Property Office of People's Republic of China, Office Action of corresponding CN Patent Application No. 201780018639.4, dated Jun. 2, 2020.

* cited by examiner

HANDOVER CONTROL METHOD AND DEVICE THEREFOR

CROSS REFERENCE TO RELATED APPLICATIONS

This application is a National Stage Patent Application of PCT International Patent Application No. PCT/KR2017/003431 (filed on Mar. 29, 2017) under 35 U.S.C. § 371, which claims priority to Korean Patent Application Nos. 10-2016-0040471 (filed on Apr. 1, 2016) and 10-2017-0036293 (filed on Mar. 22, 2017), the teachings of which are incorporated herein in their entireties by reference.

TECHNICAL FIELD

The present disclosure relates to a method for reducing service interruption delay during handover of a mobile communication User Equipment (UE), and a device therefor.

BACKGROUND ART

Due to advances in communication systems, various wireless UEs have been introduced to consumers, including both companies and individuals. Current mobile communication systems have employed technology related to $3^{rd}$ generation partnership project (3GPP), for example, Long Term Evolution (LTE), LTE-Advanced (LTE-A), and the like. Such mobile communication systems are high-speed and high-capacity communication systems capable of transmitting and receiving a large amount of data at a high speed.

To transmit and receive a large amount of data at a high speed, small-cell technology is introduced for providing a communication service to a UE i) at a boundary of a comparatively large service area provided by an eNB or ii) at a hot spot where a plurality of users is gathered in a comparatively small area. The UE may transmit and receive a large amount of data at a high speed through i) an eNB that provides a comparatively large service area and ii) a small-cell eNB that provides a relatively small service area.

Handover technology enables a user to continuously and seamlessly transmit and receive data while the user moves. However, such handover causes drawbacks. For example, as the number of small-cell eNBs increases, handover may be performed too frequently.

Furthermore, a handover process may interrupt, the connection between the UE and an eNB. Such problems cause users inconvenience.

DETAILED DESCRIPTION OF THE INVENTION

Technical Problem

In accordance with an embodiment, a method and device may be provided for reducing a data transmission/reception delay between a UE and an eNB during a handover procedure.

In accordance with another embodiment, a method and device may be provided for minimizing a service delay time by maintaining connection with a source eNB while connecting to a target eNB during a handover process.

Technical Solution

In accordance with an aspect of the present disclosure, there is provided a method of controlling handover of a User Equipment (UE) by a source evolved NodeB (eNB). The method may include: transmitting a handover request message including information indicating an improved handover mode for reducing service interruption to a target eNB when performing handover of the UE is determined; receiving a handover request acknowledgement message including information indicating the handover mode from the target eNB; transmitting a Radio Resource Control (RRC) connection reconfiguration message including mobility control information to the UE; and maintaining connection to the UE and continually performing a data transmission/reception operation with the UE until the UE transmits a first signal to a target cell of the target eNB according to the handover mode.

In accordance with another aspect of the present disclosure, there is provided a method of performing handover by a UE. The method may include: receiving, from a source eNB, a Radio Resource Control (RRC) connection reconfiguration message including information indicating a handover mode for reducing service interruption; maintaining a data transmission/reception operation performed with the source eNB when the handover mode is configured; transmitting a signal for random access to a target eNB; and disconnecting the connection to the UE and interrupting the data transmission/reception operation performed with the source eNB based on whether the signal is transmitted.

In accordance with another aspect of the present disclosure, there is provided a source eNB for controlling handover of a UE. The source eNB may include: a transmitter configured to transmit a handover request message including information indicating a handover mode for reducing service interruption to a target eNB when performing handover of the UE is determined; a receiver configured to receive, from the target eNB, a handover request acknowledgement message including information indicating the handover mode; and a controller configured to perform control so as to maintain a data transmission/reception operation performed with the UE until the UE transmits a first signal to a target cell of the target eNB according to the handover mode, wherein the transmitter further transmits a Radio Resource Control (RRC) connection reconfiguration message including mobility control information to the UE.

In accordance with another aspect of the present disclosure, there is provided a UE for performing handover. The UE may include: a receiver configured to receive, from a source eNB, a Radio Resource Control (RRC) connection reconfiguration message including information indicating a handover mode for reducing service interruption; a controller configured to maintain connection to the source eNB and continually perform a data transmission/reception operation with the source eNB when the handover mode is configured; and a transmitter configured to transmit a signal for random access to a target eNB, wherein the controller interrupts the data transmission/reception operation performed with the source eNB based on whether the signal is transmitted.

Advantageous Effects

As described, a period causing interruption in the connection between a UE and an eNB during a handover process may be minimized according to embodiments. Accordingly, a service delay in handover may be prevented, and user's satisfaction may be improved.

MODE FOR CARRYING OUT THE INVENTION

Figure 1:
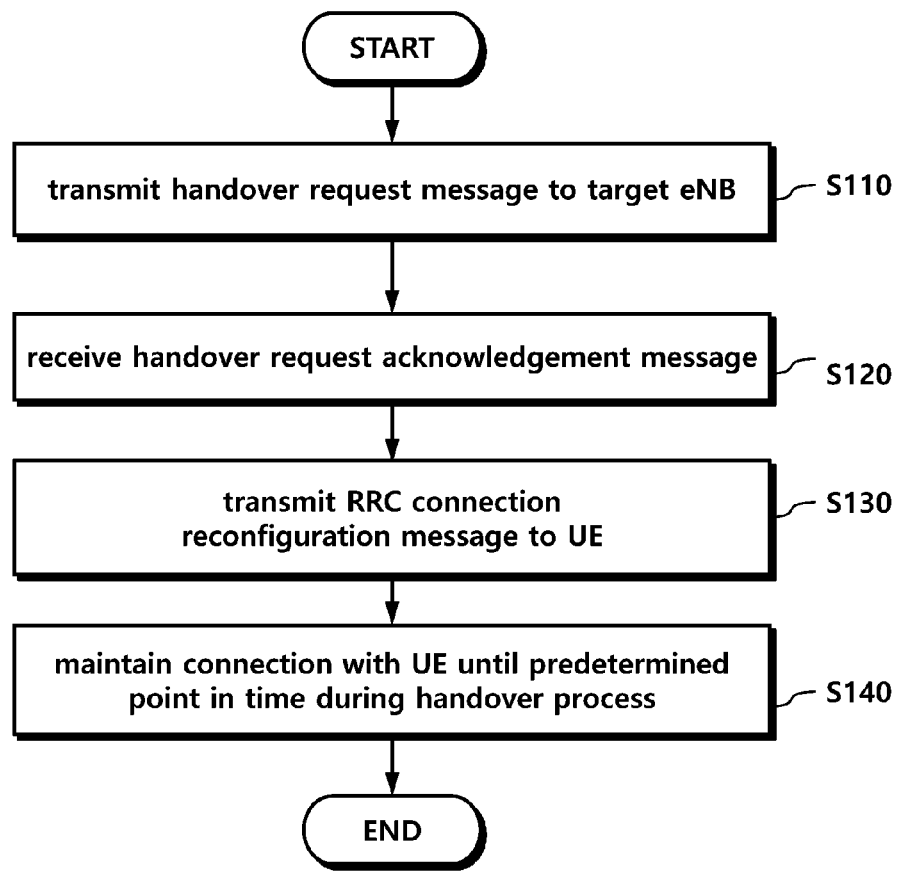
FIG. 1 is a flowchart illustrating operations of a source evolved NodeB (eNB) according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, an machine type communication (MTC) terminal may refer to a terminal that supports low cost (or low complexity), a terminal that supports coverage enhancement, or the like. In the present specifications, the MTC terminal may refer to a terminal that supports low cost (or low complexity) and coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with a typical LTE coverage, or supports low power consumption, or may refer to a newly defined Release 13 low cost (or low complexity) UE category/type.

The wireless communication system may be widely installed to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems form mobile communication (GSM).

A base station or a cell may generally denote a station where communication with a User Equipment (UE) is performed. The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways. i) the base station may be a device that provides a megacell, a macrocell, a microcell, a picocell, a femtocell, and a small cell in association with a wireless area, or ii) the base station may indicate a wireless area itself. In i), a base station may be devices that interact with one another to provide a predetermined wireless communication service area i) by being controlled by an identical entity or ii) by cooperating with one another. Based on a configuration type of a wireless communication service area, a base station may be an eNB, an RRH, an antenna, an RU, a Low Power Node (LPN), a point, a transmission/reception point, a transmission point, a reception point, and the like. In ii), a base station may be a wireless area itself that receives or transmits a signal from a perspective of a terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications. However, the user equipment and the base station may not be limited to a predetermined term or word. In the specification, the user equipment and the base station are used as two (uplink or downlink) inclusive transceiving subjects to embody the technology and technical concepts described in the specifications, but embodiments are not limited thereto. Here, Uplink (UL) refers to data transmission and reception from a UE to a base station, and Downlink (DL) refers to data transmission and reception from a base station to a UE.

Varied multiple access schemes may be unrestrictedly applied to the wireless communication system. Various multiple access schemes may include CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. Embodiments of the present disclosure may be applicable to resource allocation in an asynchronous wireless communication scheme that is advanced through GSM, WCDMA, and HSPA, to be LTE and LTE-advanced. Further, embodiments of the present disclosure may be applicable to resource allocation in a synchronous wireless communication scheme that is advanced through CDMA and CDMA-2000, to be UMB. However, the embodiments of the present disclosure may not be limited to a specific wireless communication field.

Uplink transmission and downlink transmission may be performed based on i) a TDD (Time Division Duplex) scheme that performs transmission based on different times or ii) an FDD (Frequency Division Duplex) scheme that performs transmission based on different frequencies.

Further, for a system such as LTE and LTE-A, a standard may be defined by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and the downlink may transmit data through a data channel, such as a PDSCH (Physical Downlink Shared CHannel), a PUSCH (Physical Uplink Shared CHannel), and the like.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be i) a base station or ii) an eNB (e.g., a macro cell) and at least one RRH that is connected to the eNB through an optical cable (e.g., an optical fiber) and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In an uplink, a transmitter may be a part of a terminal and a receiver may be a part of a multiple transmission/reception point. In an uplink, a transmitter may be a part of a terminal and a receiver may be a part of a multiple transmission/reception point.

Hereinafter, signal transmission and reception through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes the same meaning of "an EPDCCH is transmitted or received, or a signal is transmitted or received through an EPDCCH".

That is, a physical downlink control channel used herein may indicate a PDCCH or an EPDCCH, and the physical downlink control channel may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB may transmit a Physical Downlink Shared Channel (PDSCH) which is a primary physical channel for unicast transmission. Further, the eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

In the present specification, "handover" indicates technology that is used when a User Equipment (UE) moves from one evolved NodeB (eNB) or cell to another. The handover includes a signal transmission/reception operation and a signal-processing operation, which are performed among a UE, a source eNB, and a target eNB. In addition, the term "source eNB" indicates an eNB that establishes a connection with the UE for data transmission/reception at the point in time at which a handover procedure starts, and "target eNB" indicates an eNB with which the UE desires to establish a connection for data transmission/reception according to a handover procedure. Hereinafter, an object from which the UE leaves according to a handover procedure will be mentioned and described as a "source eNB" or a "source cell", and an object with which the UE desires to establish a wireless connection according to the handover procedure will be mentioned and described as a target eNB or a target cell.

In handover technology, the target eNB prepares for handover in response to a handover request message from the source eNB. The target eNB generates a Radio Resource Control (RRC) message (e.g., an RRCConnectionReconfiguration message including mobilityControlInformation) to be transmitted to the UE for performing handover. The target eNB transmits a handover request acknowledgement (ACKNOWLEDGE) message to the source eNB.

The handover request acknowledgement message may include a container that carries an RRC message to be transmitted to the UE for performing handover. The container may include a new C-RNTI, a target eNB security algorithm identifier, a dedicated RACH preamble, target eNB SIBS, some other parameters, and the like. The above-described RRC message to be transmitted to the UE may be an RRC reconfiguration message including mobilitycontrolInfo, which is generated by the target eNB and may be transferred to the UE via the source eNB. The source eNB performs integrity protection and ciphering required for the RRC message.

Subsequently, the source eNB stops downlink data transmission to the UE.

The UE receives the RRCConnectionReconfiguration message including mobilityControlInformation, performs synchronization with the target eNB, and accesses a target cell via a RACH.

The UE derives a target eNB-specific key and configures a selected security algorithm to be used in the target cell. This operation will be described in detail below.

The UE receives the RRCConnectionReconfiguration message including mobilityControlInformation, and when a carrier frequency (carrierFreq) is included, the UE considers, as a target PCell, one of frequencies indicated by the carrier frequency having the physical cell identifier indicated by targetPhysCellId. When the carrier frequency (carrierFreq) is not included, the UE may consider, as a target PCell, one of the frequencies of the source PCell having the physical cell identifier indicated by targetPhysCellId.

The UE starts synchronization with the downlink of the target PCell.

The UE resets a Master Cell Group (MCG) MAC and resets a Secondary Cell Group (SCG) MAC when the SCG MAC is configured.

The UE re-establishes a PDCP with respect to all configured Radio Bearers (RBs).

The UE re-establishes an MCG RLC for all configured Radio Bearers (RBs) and re-establishes an SCG RLC when the SCG RLC is configured.

The UE performs configuration such that an SCell(s) is considered inactive in a lower layer when the SCell is configured.

The UE applies a new UE identifier (newUE-Identity) value as C-RNTI.

The UE may submit an RRC Connection Reconfiguration Complete message to a lower layer for transmission.

The target eNB responds with UL allocation and timing advance.

When the UE successfully accesses a target cell, the UE may transmit, to the target eNB, an uplink Buffer Status Report (BSR) together with an RRCConnectionReconfigurationComplete message (e.g., including a C-RNTI) for indicating that handover for the UE is completed, so as to acknowledge handover. The target eNB may verify a C-RNTI included in the RRCConnectionReconfigurationComplete message.

The target eNB starts transmitting data to the UE.

As described above, the legacy E-UTRAN technology needs to perform random access to perform handover as a cell is changed. Also, until the target cell receives the RRCConnectionReconfigurationComplete message indicating that handover is completed from the UE after the UE receives an RRC message and accesses the target cells, data communication between the UE and the source eNB may be interrupted, and a data transmission/reception operation of the UE may be interrupted since the UE is not connected to the target cell.

When the interruption time attributable to handover on a wireless network increases, this may have a negative effect on the actual user experience. For example, interruption frequently occurs longer than or equal to 50 ms on wireless networks during the handover. Therefore, there is a desire for a method of reducing the delay in order to provide improved communication quality.

In the present specification, a handover procedure is introduced for reducing such service interruption. For example, a method may be provided for maintaining the connection between a UE and a source eNB during performing a handover procedure. For another example, a method may be provided for not performing random access to a target eNB (RACH-less handover) during preforming a handover procedure. For example, when synchronization is performed on a source cell and a target cell, a subframe boundary between the source cell and the target cell in the synchronized network is considered aligned. In this instance, one method is to switch the UE from the source cell to the target cell without requiring a random-access procedure, and the other method is to skip a RACH-related step even though the legacy handover procedure is used.

However, in order to apply the above-described methods to a UE and an eNB, a detailed procedure needs to be provided. Hereinafter, a handover method for reducing the above-described service delay according to an embodiment will be described in detail. Such an improved handover method according an embodiment may be applied to legacy UEs.

Hereinafter, the handover procedure and technology according to embodiments of the present disclosure will be referred to as "improved handover" for convenience of description and ease of understanding. However, embodiments of the present disclosure are not limited thereto. Therefore, the handover procedure described in each embodiment will be referred to as "improved handover", and the name "improved handover" indicates handover technology performed according to the procedure described in the following embodiments.

In a handover method according an embodiment, a UE maintains a communication connection with a source eNB until a predetermined time point during a handover process.

For example, when a UE supports the improved handover, a source eNB determines to perform handover of the UE and proceeds with handover operations according to the improved handover procedure. In this instance, the communication connection between the source eNB and the UE may be controlled or set to be maintained until a predetermined time point (e.g., until the UE transmits an initial random-access signal to a target eNB). That is, typically, when a UE receives a handover command, the UE may interrupt the connection with a source eNB and attempt to access a target eNB according to a random-access procedure. Therefore, a service is interrupted from a time point of disconnecting the UE from the source eNB and delayed until a time point of connecting the UE to the target eNB by completely performing the random-access procedure.

In order to overcome such a problem, in the improved handover procedure according to embodiments, the communication connection between the UE and the source eNB may be controlled to be maintained until a predetermined time point even when the UE receives a handover command from the source eNB. Hereinafter, the improved handover procedure according to embodiments will be described in detail with reference to the accompanying drawings.

FIG. 1 is a flowchart illustrating operations of a source eNB according to an embodiment.

Referring to FIG. 1, when handover of a UE is determined to perform, the source eNB transmits a handover request message to a target eNB in operation S110. The handover request message may include information indicating an improved handover mode for reducing service interruption.

For example, the source eNB may determine whether to perform handover of the UE in consideration of a measurement report or the like received from the UE. When the source eNB determines to perform handover of the UE, the source eNB may transmit information indicating an improved handover mode for reducing service interruption to the target eNB. The improved handover mode for reducing the service interruption may indicate the improved handover according to an embodiment. That is, when the UE supports the improved handover mode, the source eNB may transfer information on the improved handover mode of the corresponding UE to the target eNB. For example, the source eNB may transfer a handover request to the target eNB including information indicating the improved handover mode in the handover request message.

Also, the source eNB receives, from the target eNB, a handover request acknowledgement message including information indicating the improved handover mode in operation S120.

For example, the source eNB may receive information indicating the improved handover mode from the target eNB. As described above, the handover request acknowledgement message transmitted by the target eNB may include information indicating the improved handover mode. Particularly, the handover request acknowledgement message may include mobility control information. The mobility control information may be included in an RRC container and may include information indicating the improved handover mode for reducing service interruption. The RRC container may be received by the source eNB from the target eNB and may be transferred to the UE.

Via operations S110 and S120, the source eNB and the target eNB may be made aware that the handover procedure of the UE is to be performed using the improved handover mode for reducing service interruption.

Also, the source eNB transmits a Radio Resource Control (RRC) connection reconfiguration message including mobility control information to the UE in operation S130. For example, the source eNB may transmit the RRC container received from the target eNB to the UE. As described above, the RRC container may include mobility control information and may include information indicating the improved handover mode generated by the target eNB. The RRC container may be included in the RRC connection reconfiguration message and may be transferred to the UE. The UE may receive the RRC connection reconfiguration message and may perform a handover procedure according to the improved handover mode.

The source eNB may perform control operations for maintaining data transmission/reception to/from the UE until the UE transmits a first signal to a target cell of the target eNB according to the improved handover mode in operation S140.

For example, according to the improved handover mode, the source eNB does not interrupt the connection to the UE immediately after transmitting the RRC connection reconfiguration message, but maintains the connection with the UE until a predetermined time point according to an embodiment.

For example, the source eNB may maintain the data transmission/reception operation with the UE until the UE transmits a first signal to the target cell of the target eNB according to a handover command. For example, the first signal may be a random-access signal that the UE transmits via a PRACH channel to access the target eNB. Therefore, the first signal may include random-access preamble information.

Therefore, the source eNB does not interrupt the communication connection immediately after commanding the UE to perform handover, but maintains the communication connection until a predetermined time point, whereby service delays may be avoided.

Alternatively, the source eNB may receive information indicating completion of handover of the UE from the target eNB. The source eNB may interrupt the data transmission/reception operation with the UE upon receiving information indicating the completion of handover of the UE.

Figure 2:
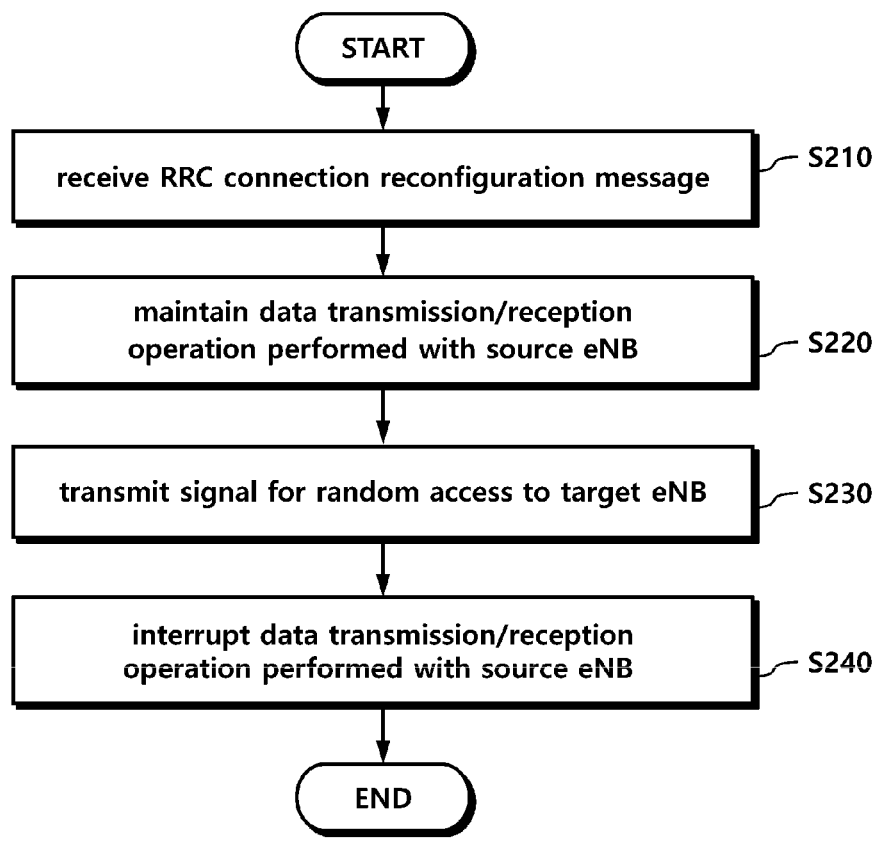
FIG. 2 is a flowchart illustrating operations of a User Equipment (UE) according to an embodiment.

FIG. 2 is a flowchart illustrating operations of a UE according to an embodiment.

Referring to FIG. 2, the UE may receive a Radio Resource Control (RRC) connection reconfiguration message including information indicating an improved handover mode for reducing service interruption from a source eNB in operation S210. The UE receives a handover command from the source eNB. The handover command may be included in the RRC connection reconfiguration message. The RRC connection reconfiguration message may include an RRC container. For example, the RRC container may include mobility control information, and the mobility control information may include information indicating an improved handover mode for reducing service interruption. The RRC container may be generated by a target eNB and may be transmitted to the UE via the source eNB.

The UE may perform a procedure according to the improved handover mode based on information indicating the improved handover mode included in the RRC connection reconfiguration message. In this instance, the UE may indicate whether the UE has configuration for supporting the improved handover mode. When the UE is a legacy UE and does not support the improved handover mode, the UE does not have the configuration for supporting the improved handover mode. Accordingly, the UE may interrupt the connection with the source eNB and may operate according to the legacy handover mode.

Further, when the UE has the configuration for supporting the improved handover mode, the UE may perform operations of maintaining a data transmission/reception operation with the source eNB in operation S220. When the UE includes the configuration for supporting the improved handover mode, the UE may not interrupt the connection with the source eNB immediately after receiving a handover command, but may maintain the data transmission/reception operation with the source eNB. For example, the UE may not immediately reset an MCG MAC and an SCG MAC associated with the source eNB, but may maintain the same. Also, the UE may not perform PDCP re-establishment with respect to all configured RBs, but may maintain the same. The configuration for supporting the improved hand over mode may be a hardware circuit block or a software function block for performing necessary operations to maintain connection to a source eNB until a predetermined time point under the control of a main processor of the UE. However, the embodiments of the present disclosure are not limited thereto.

The UE may perform transmitting a signal for random access to the target eNB in operation S230. For example, the UE may transmit a random-access signal for accessing the target eNB according to the improved handover mode procedure. The random-access signal may include a random-access preamble.

The UE may perform interrupting the data transmission/reception operation performed with the source eNB based on whether a signal is transmitted in operation S240.

For example, the UE may interrupt the transmission/reception operation performed with the source eNB when random-access preamble information is transmitted via a Physical Random Access Channel (PRACH) to the target cell of the target eNB. For example, the UE may transmit a random-access preamble to the target eNB, may reset a MAC entity associated with the source eNB, and may perform PDCP re-establishment with respect to all RBs.

Subsequently, the UE receives a random-access response from the target eNB, completes the random-access procedure, proceeds with synchronization with the target eNB, and starts the data transmission/reception operation with the target eNB.

For another example, the UE may transmit a random-access completion message to the target eNB and may interrupt the connection with the source eNB. In this instance, the target eNB may transmit, to the source eNB, information associated with completion of random access performed with the UE. The source eNB may receive the information associated with the completion of random access from the target eNB and may perform an operation of interrupting data transmission/reception performed with the UE.

As described, according to the embodiment, in the handover procedure, the UE and the source eNB maintain the communication connection until a predetermined time point, thereby minimizing service delay. Therefore, the quality of communication may be improved.

Hereinafter, each operation in the embodiments described with reference to FIGS. 1 and 2, or additional operations according to various embodiments will be described in detail.

Method of Indicating Improved Handover According to UE Capability Information

An eNB may need to accurately recognize UE capability in order to provide an appropriate configuration to an RRC-connected UE. Typically, an MME stores UE capability configured with UE Radio Access Capability and UE Core Network Capability.

To this end, for example, the UE Core Network Capability may be indicated by the UE via NAS signaling (e.g., an attach procedure or the like).

As another example, UE Radio Access Capability may be transferred from the UE to the eNB using a UE capability transfer procedure and may be transferred to the MME using an Si interface. When the eNB transmits a UE capability Enquiry message to the UE, the UE may respond with UE capability information, whereby the eNB may receive the UE capability information.

For another example, the UE may report the UE Radio Access Capability to the MME via NAS signaling (an attach procedure or the like) and may transfer the UE Radio Access Capability to the eNB via the Si interface.

The MME may transmit the UE Radio Access Capability to the eNB every time the UE enters the RRC-connected state.

The UE may transmit, to the eNB, UE capability information indicating that the UE supports an improved handover operation, distinct from the legacy handover. The UE capability information for the above-described improved handover may indicate whether the improved handover is provided for each specific band or for each specific band combination, or may indicate whether the improved handover is provided irrespective of a band.

Based on the same, the eNB may indicate whether the UE supports an improved handover mode. Hereinafter, descriptions will be provided based on the UE capability information indicating whether the UE supports the improved handover by employing configuration for maintaining a source eNB connection during handover for ease of understanding. However, the embodiments of the present disclosure are not limited thereto. For example, such UE capability information may indicate whether the UE support RACH-less handover.

Hereinafter, methods of an eNB for applying an improved handover in consideration of UE capability information according to embodiments will be described. The methods below may be independently applied or applied in combination.

1. A Method of Indicating that an Improved Handover is Supported Via Messages Exchanged Between eNBs A source eNB may indicate, in advance, whether a target eNB supports a corresponding function (e.g., improved handover) with respect to a UE that determines to perform handover. For example, via messages exchanged between eNBs (e.g., X2 setup request or X2 setup response or eNB configuration Update or mobility setting change) or messages that eNBs exchange via an MME, the source eNB may be made aware, in advance, whether the target eNB supports the corresponding function. Alternatively, the source eNB may recognize the same by requesting identification of whether the corresponding function is supported via the messages between eNBs.

To this end, information indicating whether an improved handover mode is supported may be defined and may be included in the messages between eNBs. The eNB exchanges the information when the eNB exchanges or updates application-level configuration data between eNBs, whereby whether another eNB associated via an X2 interface supports the same may be recognized.

For example, it is possible to determine whether a peer eNB supports the improved handover by receiving corresponding information through a mobility setting change procedure which enables negotiation of handover trigger setting with the peer eNB that controls a neighboring cell.

For another example, it is also possible to determine whether a peer eNB support the improved handover by receiving corresponding information through a new non UE-associated X2 signaling procedure.

For another example, it is also possible to determine whether the target eNB supports the improved handover in advance via operations, administration, and maintenance (OAM).

To this end, information indicating whether an eNB supports improved handover may be defined and exchanged between eNBs. For example, the eNB may indicate whether a peer eNB connected through an X2 interface supports the improved handover by exchanging such information when application-level configuration data is exchanged or updated between the eNB via OAM.

According to the above-described method, the source eNB may identify whether the target eNB supports the improved handover function via the UE capability information.

When the target eNB does not support the improved handover function, the source eNB may perform an operation of typical handover with the target eNB. Also, the UE capability information for indicating whether to support the improved handover may not be transferred to the target eNB.

2. A Method of a Target eNB for Indicating that Improved Handover is Supported when Both a Source eNB and the Target eNB Support an Improved Handover Mode The source eNB may transfer a handover request message including handover preparation information to the target eNB.

For example, as described in FIGS. 1 and 2, the handover request message transferred from the source eNB to the target eNB may include the above-described UE capability information (or information indicating the improved handover mode). For example, the information indicating the improved handover mode may be included in the handover preparation information. Alternatively, the information may be included in other information. When the target eNB supports the improved handover function, the target eNB prepares for the improved handover of the corresponding UE.

The target eNB transmits a handover request acknowledgement message to the source eNB.

The handover request acknowledgement message may be an RRC message for performing the improved handover and may include an RRC container to be transmitted to the UE. The RRC container may include a new C-RNTI, a target eNB security algorithm identifier, a dedicated RACH preamble, target eNB SIBS, some other parameters, and the like. The above-described RRC container may be transferred to the UE via an RRC connection reconfiguration message including mobility control information (mobilitycontrolInfo). As described in FIGS. 1 and 2, the target eNB may additionally include information indicating improved handover in the RRC message to be transmitted to the UE. Alternatively, the target eNB may additionally include information for indicating the improved handover in the handover request acknowledgement message.

The source eNB performs integrity protection and ciphering required for the RRC message.

When the RRC message including information for indicating improved handover is received, the UE may perform the improved handover operation.

After performing the improved handover operation, the UE transmits an RRC Connection Reconfiguration Complete message to the target eNB.

When an RRC message that does not include information for indicating improved handover, but indicates typical handover, is received, the UE may perform a typical handover operation.

3. A Method of a Source eNB for Indicating Improved Handover is Supported when Both the Source eNB and a Target eNB Support an Improved Handover Mode The source eNB may transfer a handover request message including handover preparation information to the target eNB.

For example, the handover request message transmitted from the source eNB to the target eNB may include the above-described UE capability information (or information indicating whether to support the improved handover mode). For example, the information may be included in the handover preparation information. Alternatively, the information may be included in other information.

When the target eNB supports the improved handover function, the target eNB prepares for the improved handover. The target eNB transmits a handover request acknowledgement message to the source eNB.

The handover request acknowledgement message may be an RRC message for performing handover and include an RRC container to be transmitted to the UE. The RRC container may include a new C-RNTI, a target eNB security algorithm identifier, a dedicated RACH preamble, target eNB SIBs, some other parameters, and the like. The RRC container may additionally include information indicating that the improved handover mode is supported.

For another example, a handover request message transmitted from the source eNB to the target eNB may not include the above-described UE capability information (or information indicating an improved handover mode). The target eNB may prepare for handover. The target eNB transmits a handover request acknowledgement message to the source eNB.

The handover request acknowledgement message may be an RRC message for performing handover and include an RRC container to be transmitted to the UE. The RRC container may include a new C-RNTI, a target eNB security algorithm identifier, a dedicated RACH preamble, target eNB SIBs, some other parameters, and the like.

The above-described RRC message may be a RRC connection reconfiguration message including mobility control information (mobilitycontrolInfo), which is generated by the target eNB and may be transferred to the UE via the source eNB. The source eNB performs integrity protection and ciphering required for the RRC message. The source eNB may additionally include information for indicating the improved handover mode in the RRC message transmitted to the UE. Alternatively, based on the information indicating the improved handover included in the RRC message or in the handover request acknowledgement message transferred from the target eNB, the source eNB may additionally include information for indicating the improved handover in the RRC message transmitted to the UE. The source eNB may include RRC container information for performing handover, which is received from the target eNB, in the RRC message to be transmitted to the UE.

Upon the receipt of the RRC message including information for indicating improved handover, the UE may perform the improved handover operation.

That is, the UE may transfer, to the source eNB, an acknowledgement message indicating that the UE successfully receives the configuration that the source eNB adds using the RRC message.

When an RRC message that does not include information for indicating improved handover, but indicates typical handover, is received, the UE may perform a typical handover operation.

4. A Method of a Target eNB for Informing of a Source eNB Whether Improved Handover is Supported and Performed Via a Handover Request Acknowledgement Message The source eNB may transfer a handover request message including handover preparation information to the target eNB.

For example, the handover request message transmitted from the source eNB to the target eNB may include the above-described UE capability information (or information indicating an improved handover mode). For example, the information may be included in the handover preparation information. Alternatively, the information may be included in other information.

When the target eNB does not support the improved handover function, the target eNB may perform an operation for providing typical handover (generating an RRCConnectionReconfiguration message including mobilityControlInformation and transferring a handover request acknowledgement (ACKNOWLEDGE) message to the source eNB).

When the target eNB supports the improved handover function, the target eNB may perform an operation for providing improved handover/normal handover (generating an RRCConnectionReconfiguration message including mobilityControlInformation and transferring a handover request acknowledgement (ACKNOWLEDGE) message to the source eNB). In this instance, the handover request acknowledgement message may additionally include information for identifying typical handover and improved handover.

5. A Method of a Source eNB for Performing an Improved Handover Function Irrespective of Whether the Target eNB Supports the Improved Handover Function or not The source eNB may transfer a handover request message including handover preparation information to the target eNB.

For example, the source eNB may transfer the handover request message including the handover preparation information to the target eNB. In this instance, for example, UE capability information for improved handover may not be transferred to the target eNB.

The target eNB may prepare for handover. The target eNB transmits a handover request acknowledgement message to the source eNB. The handover request acknowledgement message may be an RRC message for performing handover and include an RRC container to be transmitted to the UE. The RRC container may include a new C-RNTI, a target eNB security algorithm identifier, a dedicated RACH preamble, target eNB SIBS, some other parameters, and the like. The above-described RRC message may be an RRC reconfiguration message including mobilitycontrolInfo, which is generated by the target eNB and may be transferred to the UE via the source eNB. The source eNB performs integrity protection and ciphering required for the RRC message. The RRC message that the source eNB transmits to the UE may include RRC message information (the above-described RRC container to be transmitted to the UE) for performing handover, which is received from the target eNB. The source eNB may additionally include information for indicating the improved handover in the RRC message to be transmitted to the UE.

When the RRC message (RRC reconfiguration message) including information for indicating improved handover is received, the UE may perform the improved handover operation.

The UE may transmit, to the source eNB, an acknowledgement message for the RRC message received from the source eNB. That is, the UE may transfer, to the source eNB, an acknowledgement message indicating that the UE successfully receives the configuration that the source eNB adds using the RRC message.

When an RRC message that does not include information for indicating improved handover, but indicates typical handover, is received, the UE may perform a typical handover operation.

Hereinafter, methods of a UE and an eNB for performing handover according to an improved handover mode according to embodiments will be described.

Methods of Performing an Improved Handover Procedure

Figure 3:
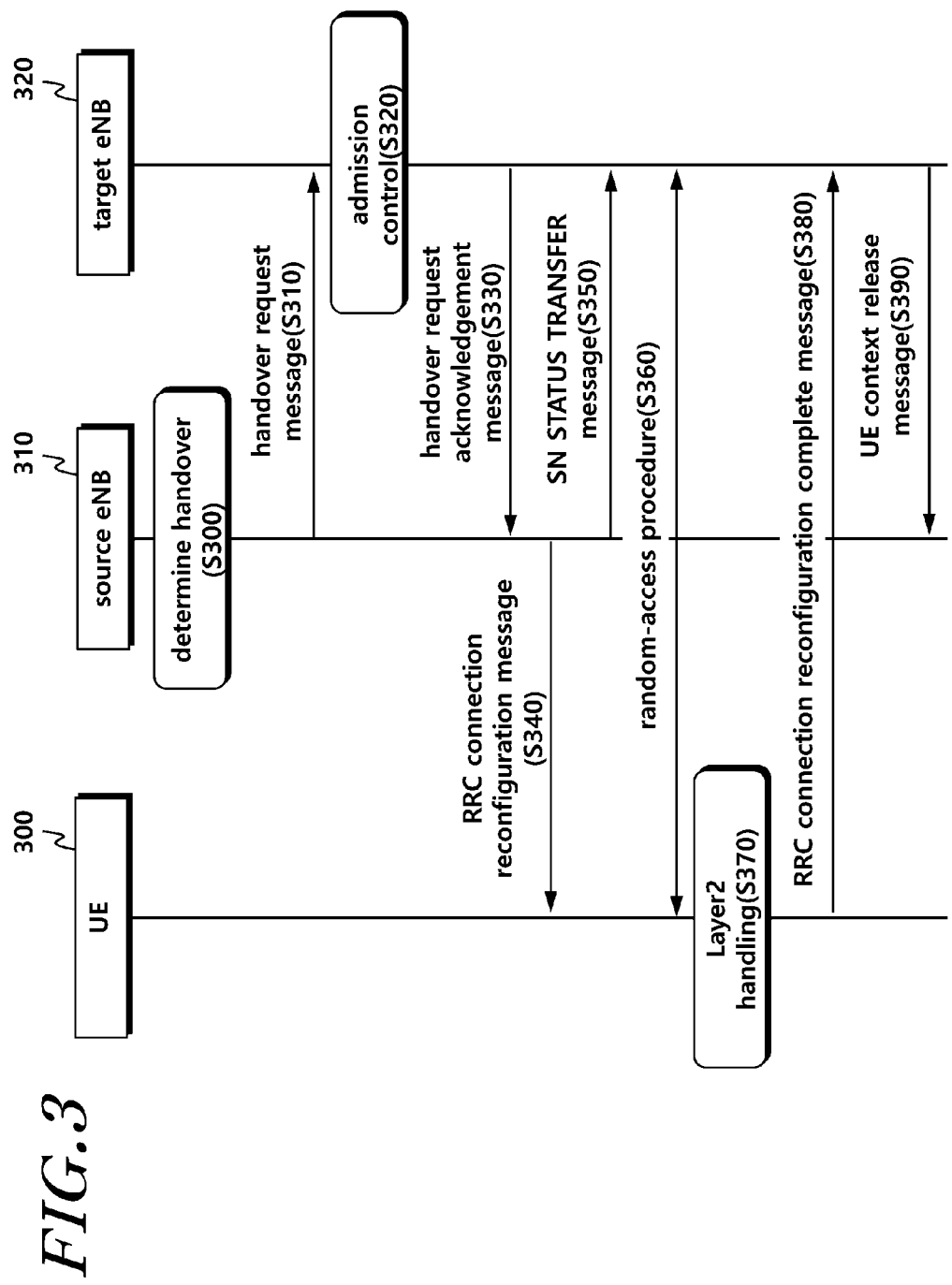
FIG. 3 is a diagram for describing a handover procedure according to an embodiment.

FIG. 3 is a signal flowchart illustrating a method for performing handover based on an improved handover mode according to an embodiment.

Referring to FIG. 3, a source eNB 310 determines handover of a UE 300 based on a measurement report and RRM information in operation S300.

The source eNB 310 transmits a handover request message to a target eNB 320 in operation S310.

Based on received E-RAB QoS information, admission control may be performed in the target eNB 320.

The target eNB 320 prepares for handover. The target eNB 320 transmits a handover request acknowledgement message to the source eNB 310 in operation S330. The handover request acknowledgement message may be an RRC message for performing handover and include an RRC container to be transmitted to the UE 300.

The source eNB 310 may transmit an RRCConnectionReconfiguration message including mobilityControlInformation to the UE 300 in operation S340.

The source eNB 310 may transmit an SN STATUS TRANSFER message to the target eNB 320 to carry an uplink PDCP SN receiver state and a downlink PDCP SN transmitter state in operation S350.

When the RRCConnectionReconfiguration message including mobilityControlInformation is received, the UE 300 may synchronize with the target eNB 320 and access a target cell via a RACH in operation S360. The target eNB 320 may respond with uplink allocation and timing advancement.

The UE 300 may control the connection with the source eNB 310 according to a random-access procedure in operation S370.

For example, when the UE 300 successfully accesses the target cell, the UE 300 may release the connection with the source eNB 310.

For example, when the UE 300 successfully accesses the target cell, the UE 300 may reconfigure/re-establish/process an entity connected to the source eNB 310. For example, the UE 300 may reset an MCG MAC and reset an SCG MAC when it is configured. The UE 300 re-establishes a PDCP with respect to all configured Radio Bearers (RBs). The UE 300 re-establishes an MCG RLC for all configured Radio Bearers (RBs) and re-establishes an SCG RLC when it is configured.

For example, when the UE 300 successfully accesses the target cell, the UE 300 may apply new configuration to the target eNB 320. For example, the UE 300 may reset an MCG MAC and reset an SCG MAC when it is configured. The UE 300 re-establishes a PDCP with respect to all configured Radio Bearers (RBs). The UE 300 re-establishes an MCG RLC for all configured Radio Bearers (RBs), and re-establishes an SCG RLC when it is configured.

The UE 300 transmits an RRC Connection Reconfiguration Complete message to the target eNB 320 in operation S380. When the UE 300 transmits the RRC Connection Reconfiguration Complete message to the target eNB 320, the UE 300 may also transmit a buffer state report therewith, when this is allowed.

By transmitting a UE Context Release message, the target eNB 320 may inform the source eNB 310 of successful HO and trigger the source eNB 310 to release the resource in operation S390.

Figure 4:
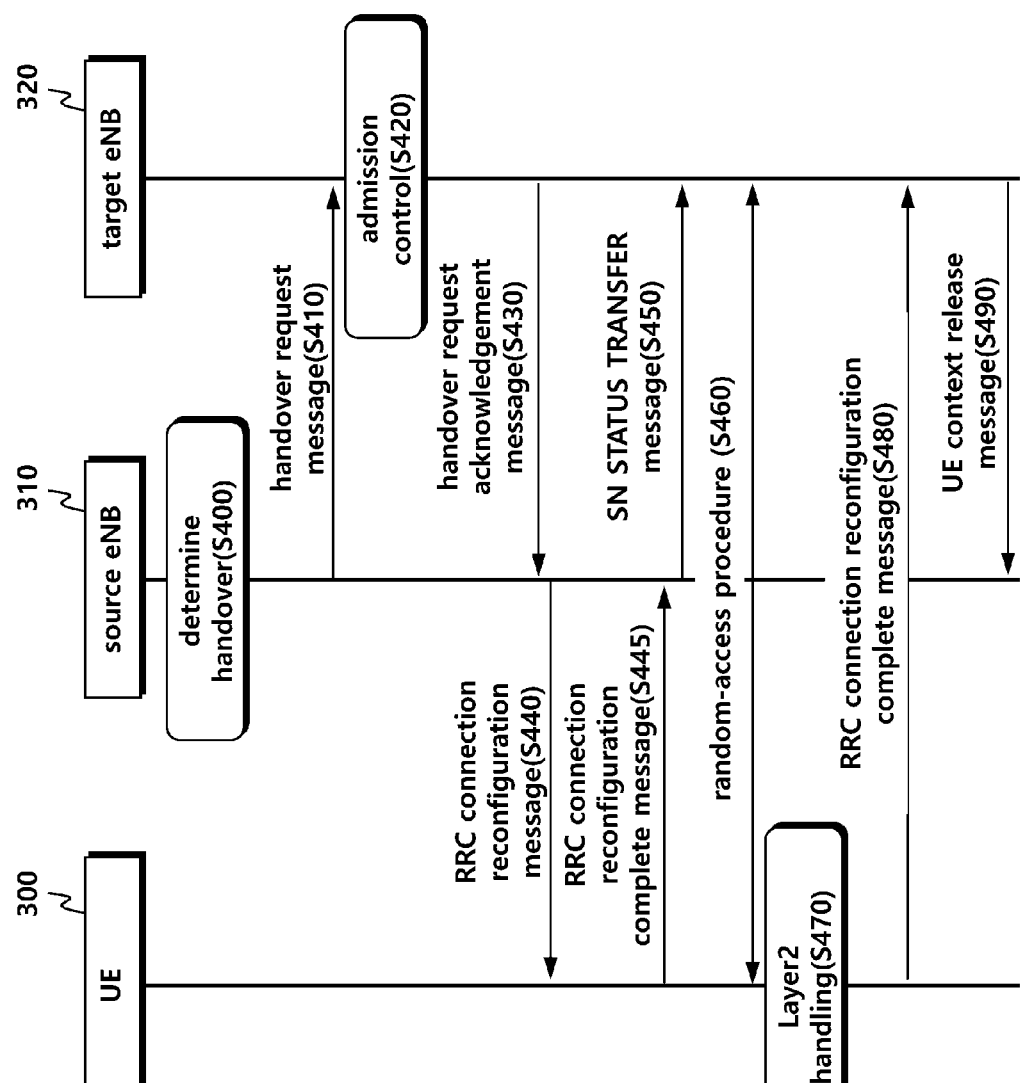
FIG. 4 is a diagram for describing a handover procedure according to another embodiment.

FIG. 4 is a signal flowchart illustrating a method for performing handover based on an improved handover mode according to another embodiment.

Referring to FIG. 4, a source eNB 310 determines handover of the UE 300 based on a measurement report and RRM information in operation S400.

The source eNB 310 transmits a handover request message to the target eNB 320 in operation S410.

Based on received E-RAB QoS information, admission control may be performed in the target eNB 320.

The target eNB 320 prepares for handover. The target eNB 320 transmits a handover request acknowledgement message to the source eNB 310 in operation S430. The handover request acknowledgement message may be an RRC message for performing handover and include an RRC container to be transmitted to the UE 300.

The source eNB 310 may transmit an RRCConnectionReconfiguration message including mobilityControlInformation to the UE 300 in operation S440.

The UE 300 transmits an RRC Connection Reconfiguration Complete message to the source eNB 310 to acknowledge that an improved handover message is received in operation S445.

The source eNB 310 may transmit an SN STATUS TRANSFER message to the target eNB 320 to carry an uplink PDCP SN receiver state and a downlink PDCP SN transmitter state in operation S450. Alternatively, operation S450 may be performed before operation S445.

The UE 300 synchronizes with the target eNB 320 and accesses a target cell via a RACH in operation S460. The target eNB 320 may respond with uplink allocation and timing advancement.

The UE 300 may control the connection with the source eNB 310 according to a random-access procedure to the target cell in operation S470.

For example, when the UE 300 successfully accesses the target cell, the UE 300 may release the connection with the source eNB 310.

As another example, when the UE 300 successfully accesses the target cell, the UE 300 may reconfigure/re-establish/process an entity connected to the source eNB 310. For example, the UE 300 may reset an MCG MAC and reset an SCG MAC when it is configured. The UE 300 re-establishes a PDCP with respect to all configured Radio Bearers (RBs). The UE 300 re-establishes an MCG RLC for all configured Radio Bearers (RBs), and re-establishes an SCG RLC when it is configured.

As another example, when the UE 300 successfully accesses the target cell, the UE 300 may apply a new configuration to the target eNB 320. For example, the UE 300 may reset an MCG MAC and may reset an SCG MAC when it is configured. The UE 300 re-establishes a PDCP with respect to all configured Radio Bearers (RBs). The UE 300 re-establishes an MCG RLC for all configured Radio Bearers (RBs), and re-establishes an SCG RLC when it is configured.

The UE 300 transmits an RRC Connection Reconfiguration Complete message to the target eNB 320 in operation S480. Alternatively, the UE 300 may transmit an RRC message indicating that the UE 300 successfully applies a new configuration to the target eNB 320 (here, the RRC message is expressed as a connection status report for ease of description, but the scope of the present disclosure may include using another term to express a message including information that indicates, to the target eNB 320, that the configuration indicated by the target eNB 320 is successfully applied). When transmitting the RRC Connection Reconfiguration Complete message (or RRC message indicating that a new configuration is successfully applied) to the target eNB 320, the UE 300 may also transmit a buffer state report therewith, when this is allowed.

By transmitting a UE Context Release message, the target eNB 320 may inform the source eNB 310 of successful HO and trigger the source eNB 310 to release the resource in operation S490.

Figure 5:
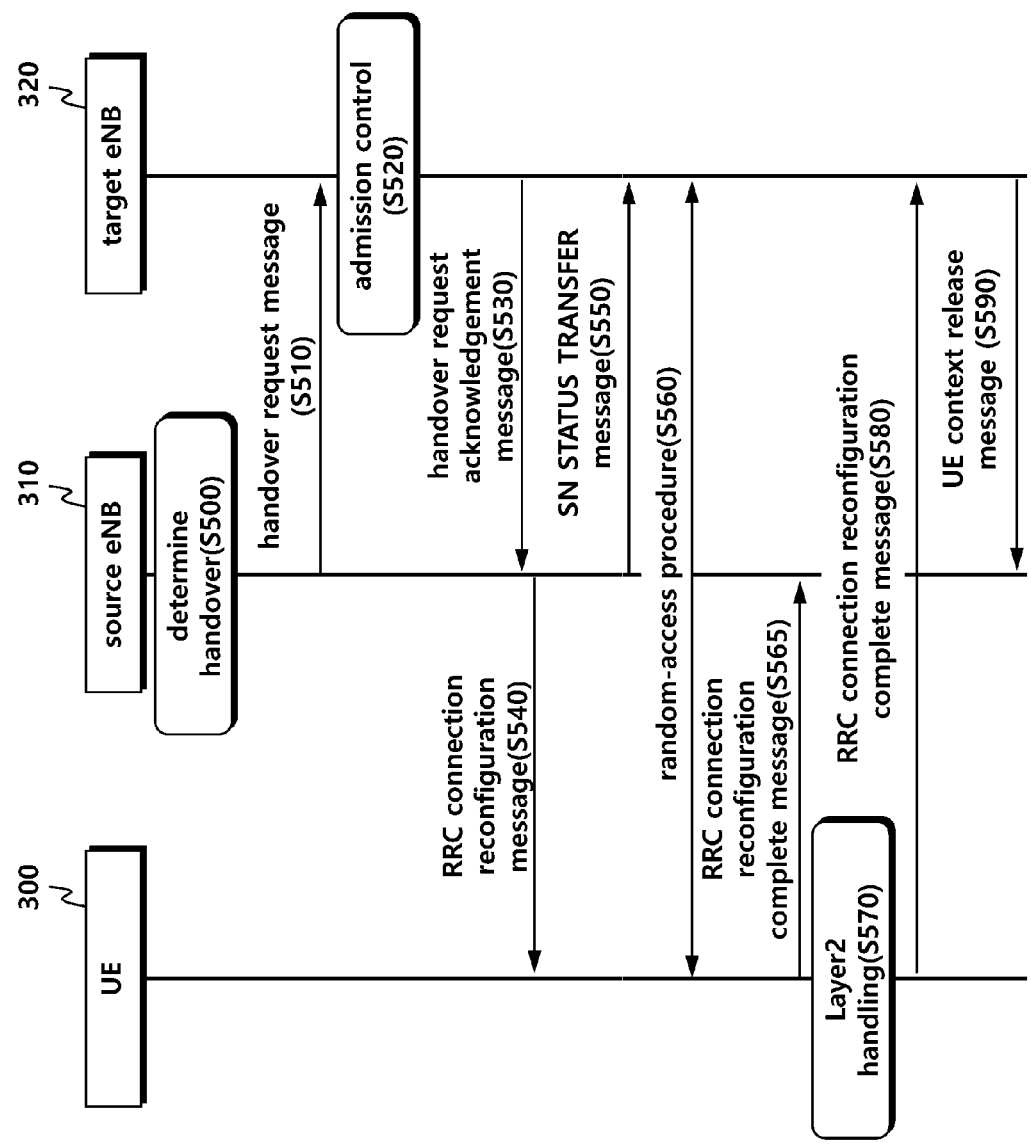
FIG. 5 is a diagram for describing a handover procedure according to still another embodiment.

FIG. 5 is a signal flowchart illustrating a method for performing handover based on an improved handover mode according to further another embodiment.

Referring to FIG. 5, the source eNB 310 determines handover of the UE 300 based on a measurement report and RRM information in operation S500.

The source eNB 310 transmits a handover request message to the target eNB 320 in operation S510.

Based on received E-RAB QoS information, admission control may be performed in the target eNB 320 in operation S520.

The target eNB 320 prepares for handover. The target eNB 320 transmits a handover request acknowledgement message to the source eNB 310 in operation S530. The handover request acknowledgement message may be an RRC message for performing handover and include an RRC container to be transmitted to the UE 300.

The source eNB 310 may transmit an RRCConnectionReconfiguration message including mobilityControlInformation to the UE 300 in operation S540.

The source eNB 310 may transmit an SN STATUS TRANSFER message to the target eNB 320 to carry an uplink PDCP SN receiver state and a downlink PDCP SN transmitter state in operation S550. Alternatively, operation S550 may be performed after operation S560 or S565, which will be described below.

The UE 300 synchronizes with the target eNB 320 and accesses a target cell via a RACH in operation S560. The target eNB 320 may respond with uplink allocation and timing advancement.

For example, the UE 300 transmits an RRC Connection Reconfiguration Complete message to the source eNB 310 to acknowledge that an improved handover message is received in operation S565. Alternatively, it is recognized that the UE 300 successfully performs random access to the target eNB 320. Accordingly, the source eNB 310 may stop performing downlink data transmission to the UE 300. The source eNB 310 may transmit an SN Status Transfer message to the target eNB 320.

As another example, the UE 300 transmits, to the source eNB 310, an RRC message indicating that the UE 300 successfully performs random access to the target eNB 320 (wherein the RRC message is expressed as an RA status report for ease of description, but the scope of the present disclosure may include using another term to express a message including information indicating that random access to the target eNB 320 is successfully performed). Accordingly, the source eNB 310 may stop performing downlink data transmission to the UE 300. The source eNB 310 may transmit an SN Status Transfer message to the target eNB 320. The message that the source eNB 310 transmits to the target eNB 320 may include information indicating that the UE 300 successfully accesses the target eNB 320 (or acknowledgement information with respect to information received from the target eNB 320).

The UE 300 may control the connection with the source eNB 310 according to random access to the target cell in operation S570.

For example, when the UE 300 successfully accesses the target cell, the UE 300 may release the connection with the source eNB 310.

As another example, when the UE 300 successfully accesses the target cell, the UE 300 may reconfigure/re-establish/process an entity connected to the source eNB 310. For example, the UE 300 may reset an MCG MAC and reset an SCG MAC when it is configured. The UE 300 re-establishes a PDCP with respect to all configured Radio Bearers (RBs). The UE 300 re-establishes an MCG RLC for all configured Radio Bearers (RBs) and re-establishes an SCG RLC when it is configured.

For example, when the UE 300 successfully accesses the target cell, the UE 300 may apply a new configuration to the target eNB 320. For example, the UE 300 may reset an MCG MAC and may reset an SCG MAC when it is configured. The UE 300 re-establishes a PDCP with respect to all configured Radio Bearers (RBs). The UE 300 re-establishes an MCG RLC for all configured Radio Bearers (RBs) and re-establishes an SCG RLC when it is configured.

The UE 300 transmits an RRC Connection Reconfiguration Complete message to the target eNB 320 in operation S580. Alternatively, the UE 300 may transmit an RRC message indicating that the UE 300 successfully applies a new configuration to the target eNB 320 (here, the RRC message is expressed as a connection status report for ease of description, but the scope of the present disclosure may include the use of another term to express a message including information that indicates, to the target eNB 320, that the configuration indicated by the target eNB 320 is successfully applied). When transmitting the RRC Connection Reconfiguration Complete message to the target eNB 320, the UE 300 may also transmit a buffer state report therewith, when this is allowed.

By transmitting a UE Context Release message, the target eNB 320 may inform the source eNB 310 of successful HO and trigger the source eNB 310 to release the resource in operation S590.

In each embodiment described above, some operations may be performed in a different order or omitted.

Hereinafter, a UE and a source eNB for performing handover based on an improved handover mode according to embodiments will be described again with reference to drawings.

Figure 6:
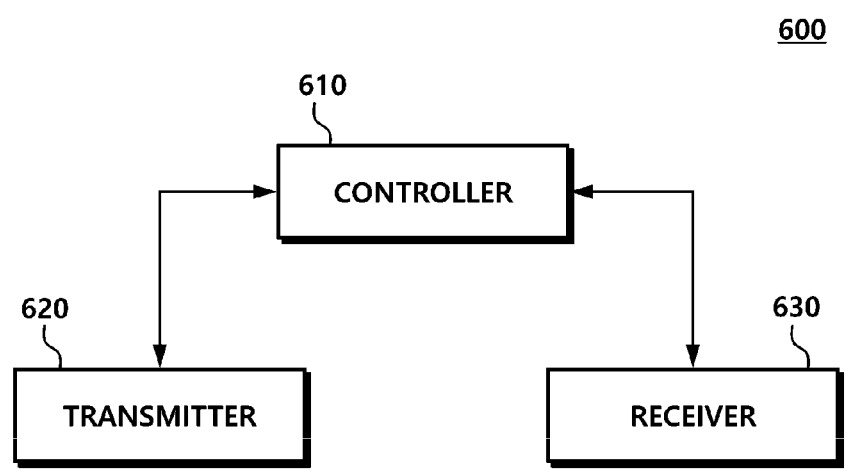
FIG. 6 is a diagram showing a source eNB according to an embodiment.

FIG. 6 illustrates a source eNB according to an embodiment.

Referring to FIG. 6, a source eNB 600 controls handover of a UE. Such a source eNB 600 may include: a transmitter 620 configured to transmit, to a target eNB, a handover request message including information indicating an improved handover mode for reducing service interruption when handover of a UE is determined; a receiver 630 configured to receive, from the target eNB, a handover request acknowledgement message including information indicating the improved handover mode; and a controller 610 configured to maintain a data transmission/reception operation performed with the UE until the UE transmits a first signal to a target cell of the target eNB according to the handover mode.

Also, the transmitter 620 may further transmit a Radio Resource Control (RRC) connection reconfiguration message including mobility control information to the UE.

The controller 610 may determine handover of the UE in consideration of a measurement report or the like received from the UE. The improved handover mode for reducing the service interruption may indicate improved handover.

The transmitter 620 may transfer a handover request to the target eNB by including information indicating an improved handover mode in the handover request message.

The receiver 630 may receive, from the target eNB, information indicating the improved handover mode. As described above, the handover request acknowledgement message transmitted by the target eNB may include information indicating the improved handover mode. Particularly, the handover request acknowledgement message may include mobility control information. The mobility control information may be included in an RRC container and include information indicating the handover mode for reducing the service interruption. The RRC container may be received by the source eNB from the target eNB, and may be transferred to the UE.

The transmitter 620 transmits the RRC container received from the target eNB to the UE. As described above, the RRC container may include mobility control information and include information indicating the improved handover mode generated by the target eNB. The RRC container may be included in the RRC connection reconfiguration message and may be transferred to the UE. The UE may receive the RRC connection reconfiguration message and perform a handover procedure according to the improved handover mode.

The controller 610 does not interrupt the connection with the UE immediately after transmitting the RRC connection reconfiguration message but maintains the connection with the UE until a predetermined time point, according to the improved handover mode.

For example, the controller 610 may maintain the data transmission/reception operation performed with the UE until the UE transmits a first signal to the target cell of the target eNB according to a handover command. For example, the first signal may be a random-access signal that the UE transmits via a PRACH channel to access the target eNB. Therefore, the first signal may include random-access preamble information.

The receiver 630 may receive, from the target eNB, information indicating completion of handover of UE. The controller 610 may interrupt the data transmission/reception operation performed with the UE upon receiving the information indicating completion of handover of the UE.

In addition, the controller 610 may control the operation of the source eNB 600 required for performing the above-described embodiments. Also, the transmitter 620 and the receiver 630 are used for transmitting/receiving, to/from the UE and the target eNB, a signal, a message, and data needed for performing the aforementioned present disclosure.

Figure 7:
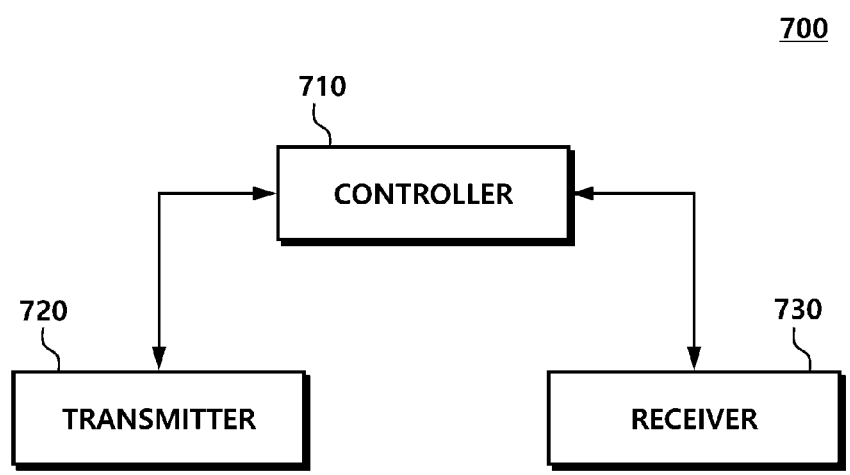
FIG. 7 is a diagram showing a UE according to an embodiment.

FIG. 7 illustrates a UE according to an embodiment.

Referring to FIG. 7, a UE 700 may include: a receiver 730 configured to receive, from a source eNB, a Radio Resource Control (RRC) connection reconfiguration message including information indicating an improved handover mode for reducing service interruption; a controller 710 configured to maintain a data transmission/reception operation performed with the source eNB when the handover mode is configured; and a transmitter 720 configured to transmit a signal for random access to a target eNB.

Also, the controller 710 may interrupt a data transmission/reception operation performed with the source eNB based on whether a signal is transmitted.

The receiver 730 receives a handover command from the source eNB. The handover command may be included in the RRC connection reconfiguration message. The RRC connection reconfiguration message may include an RRC container. For example, the RRC container may include mobility control information, and the mobility control information may include information indicating a handover mode for reducing service interruption. The RRC container may be generated by a target eNB and may be transmitted to the UE via the source eNB.

The controller 710 may perform operations for an improved handover mode based on information indicating the improved handover mode included in the RRC connection reconfiguration message. In this instance, the controller 710 may determine whether the UE includes the configuration for supporting the improved handover mode. When the UE is a legacy UE and does not support the improved handover mode, the configuration for the improved handover mode may not be made. Accordingly, the UE may interrupt the connection with the source eNB and may operate according to the legacy handover mode.

When the UE includes the configuration for supporting the improved handover mode, the controller 710 may not immediately interrupt the connection with the source eNB despite receiving a handover command, but may maintain the data transmission/reception operation performed with the source eNB. For example, the controller 710 may not immediately reset an MCG MAC and an SCG MAC associated with the source eNB, but may maintain the same. Also, the UE may not perform a PDCP re-establishment operation with respect to all configured RBs, but may maintain the same.

The transmitter 720 may transmit a random-access signal for accessing the target eNB according to the improved handover mode procedure. The random-access signal may include a random-access preamble.

The controller 710 may interrupt the transmission/reception operation performed with the source eNB when random-access preamble information is transmitted via a Physical Random Access Channel (PRACH) to the target cell of the target eNB. For example, when a random-access preamble is transmitted to the target eNB, the controller 710 resets a MAC entity associated with the source eNB, and may perform PDCP re-establishment with respect to all RBs.

Subsequently, the controller 710 receives a random-access response from the target eNB and completes the random-access procedure, and proceeds with synchronization with the target eNB and starts the data transmission/reception operation with the target eNB.

For example, the controller 710 may transmit a random-access completion message to the target eNB and interrupt the connection with the source eNB. In this instance, the target eNB may transmit, to the source eNB, information associated with completion of random access performed with the UE. The source eNB may receive the information associated with the completion of random access from the target eNB and perform an operation for interrupting data transmission/reception performed with the UE.

In addition, the receiver 730 may receive downlink control information, data, and a message from the source eNB or the target eNB via a corresponding channel. The transmitter 720 transmits uplink control information, data, and a message to the source eNB or the target eNB via a corresponding channel.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method of controlling handover of a User Equipment (UE) by a source evolved NodeB (eNB), the method comprising:
   transmitting a handover request message including information indicating an improved handover mode for reducing service interruption to a target eNB when performing handover of the UE is determined;
   receiving a handover request acknowledgement message including information indicating the improved handover mode from the target eNB;
   transmitting a Radio Resource Control (RRC) connection reconfiguration message including mobility control information to the UE;
   maintaining connection to the UE and continually performing operations for data transmission and reception to/from the UE through the maintained connection after transmitting the RRC connection reconfiguration message to the UE until the UE transmits a first signal to a target eNB according to the improved handover mode, wherein the handover request acknowledgement message comprises a Radio Resource Control (RRC) container including the mobility control information, and the mobility control information comprises information that indicates the improved handover mode, wherein the first signal comprises random-access preamble information and is transmitted by the UE to the target eNB via a Physical Random Access Channel (PRACH);
   receiving, from the target eNB, information indicating completion of handover of the UE; and
   disconnecting connection to the UE and interrupting the operations for data transmission and reception to/from the UE when the information indicating completion of handover of the UE is received.

2. A method of performing handover by a User Equipment (UE), comprising:
   receiving, from a source evolved NodeB (eNB), a Radio Resource Control (RRC) connection reconfiguration message comprising information indicating an improved handover mode for reducing service interruption;
   maintaining connection to the source eNB and continually performing a data transmission/reception operation with the source eNB when the UE includes configuration for supporting the improved handover mode;
   transmitting a signal for random access to a target eNB; and disconnecting the connection to the source eNB and interrupting the data transmission/reception operation with the source eNB based on whether the signal is transmitted, wherein the RRC connection reconfiguration message comprises mobility control information including information indicating the improved handover modewherein the disconnecting and interrupting comprises:
   disconnecting the connection and interrupting the transmission/reception operation performed with the source eNB when random-access preamble information is transmitted to a target cell of the target eNB via a Physical Random Access Channel (PRACH), wherein the disconnecting and interrupting comprises: resetting a Medium Access Control (MAC) entity of the UE; and
   wherein the information indicating the improved handover mode is generated by the target eNB and is received by the UE.

3. A source evolved NodeB (eNB) for controlling handover of a User Equipment (UE), the source eNB comprising:
   a transmitter configured to transmit a handover request message comprising information indicating an improved handover mode for reducing service interruption to a target eNB when performing handover of the UE is determined;
   a receiver configured to receive, from the target eNB, a handover request acknowledgement message comprising information indicating the improved handover mode; and a controller configured to maintain connection to the UE and continually perform a data transmission/reception operation with the UE until the UE transmits a first signal to a target cell of the target eNB according to the improved handover mode, wherein the transmitter further transmits a Radio Resource Control (RRC) connection reconfiguration message comprising mobility control information to the UE, and wherein the handover request acknowledgement message comprises a Radio Resource Control (RRC) container including the mobility control information, and the mobility control information indicates the improved handover mode wherein the first signal comprises the random-access preamble information and is transmitted by the UE to the target cell of the target eNB via a Physical Random Access Channel (PRACH), wherein the receiver further receives, from the target eNB, information indicating completion of handover of the UE; and wherein the controller disconnect the connection and interrupts the data transmission/reception operation with the UE when the information indicating completion of handover of the UE is received.

* * * * *